(12) United States Patent
Kim et al.

(10) Patent No.: US 10,895,786 B2
(45) Date of Patent: Jan. 19, 2021

(54) LIQUID CRYSTAL DISPLAY DEVICE AND METHOD OF MANUFACTURING THE SAME

(71) Applicant: SAMSUNG DISPLAY CO., LTD., Yongin-si (KR)

(72) Inventors: Dong Wook Kim, Seoul (KR); Jeong Ho Lee, Seoul (KR); Su Jin Lee, Siheung-si (KR); Sung Jin Hong, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 166 days.

(21) Appl. No.: 15/172,518

(22) Filed: Jun. 3, 2016

(65) Prior Publication Data

US 2017/0023824 A1 Jan. 26, 2017

(30) Foreign Application Priority Data

Jul. 23, 2015 (KR) .................... 10-2015-0104430

(51) Int. Cl.
*G02F 1/1343* (2006.01)
*G02F 1/1362* (2006.01)
*G02F 1/1335* (2006.01)
*G02F 1/1339* (2006.01)

(52) U.S. Cl.
CPC .... *G02F 1/13394* (2013.01); *G02F 1/136209* (2013.01); *G02F 2001/13398* (2013.01)

(58) Field of Classification Search
CPC ............ G02F 1/1333; G02F 1/133512; G02F 1/13394; G02F 1/136286; G02F 1/136209; G02F 2001/13398; G02F 2001/136295
See application file for complete search history.

(56) References Cited

U.S. PATENT DOCUMENTS

| 9,673,231 | B2* | 6/2017 | Shu | H01L 27/124 |
| 2006/0066766 | A1* | 3/2006 | Tanaka | G02F 1/13394 349/44 |
| 2007/0291217 | A1* | 12/2007 | Kang | G02F 1/136227 349/156 |
| 2008/0049176 | A1* | 2/2008 | Kim | G02F 1/133555 349/114 |
| 2011/0109861 | A1* | 5/2011 | Son | G02F 1/136209 349/141 |

(Continued)

FOREIGN PATENT DOCUMENTS

KR 20080034545 A * 4/2008 ........... G02F 1/1339
KR 10-2015-0070647 A 6/2015

*Primary Examiner* — Edward J Glick
*Assistant Examiner* — Anthony G Quash
(74) *Attorney, Agent, or Firm* — Innovation Counsel LLP

(57) ABSTRACT

A liquid crystal display device is provided. The liquid crystal display device of the disclosure includes: a first substrate and a second substrate facing each other; a liquid crystal layer interposed between the first substrate and the second substrate; a column spacer disposed on the first substrate and maintaining a gap between the first substrate and the second substrate; a light blocking pattern disposed on the first substrate and including an extended portion formed around the column spacer; and light blocking metal overlapped with at least a part of a region adjacent to and outside of a boundary of the extended portion that is not parallel to an alignment direction of liquid crystal molecules.

12 Claims, 14 Drawing Sheets

(56) References Cited

U.S. PATENT DOCUMENTS

| | | | |
|---|---|---|---|
| 2012/0038867 A1* | 2/2012 | Kwon | G02F 1/133512 349/110 |
| 2013/0077031 A1* | 3/2013 | Kim | G02F 1/13394 349/106 |
| 2013/0222723 A1* | 8/2013 | Kim | H01L 33/58 349/40 |
| 2014/0313463 A1* | 10/2014 | Jang | G02F 1/136209 349/106 |
| 2014/0346496 A1* | 11/2014 | Ro | H01L 27/1248 257/43 |
| 2015/0092138 A1* | 4/2015 | Kwak | G02F 1/133512 349/85 |
| 2015/0103296 A1* | 4/2015 | Kwak | G02F 1/134309 349/106 |
| 2015/0168772 A1* | 6/2015 | Jung | G02F 1/13394 349/106 |
| 2015/0370105 A1* | 12/2015 | Hong | G02F 1/136209 349/43 |
| 2016/0148838 A1* | 5/2016 | Shu | H01L 27/124 257/72 |
| 2016/0202526 A1* | 7/2016 | Shim | G02F 1/13394 257/72 |

* cited by examiner

[FIG. 1]
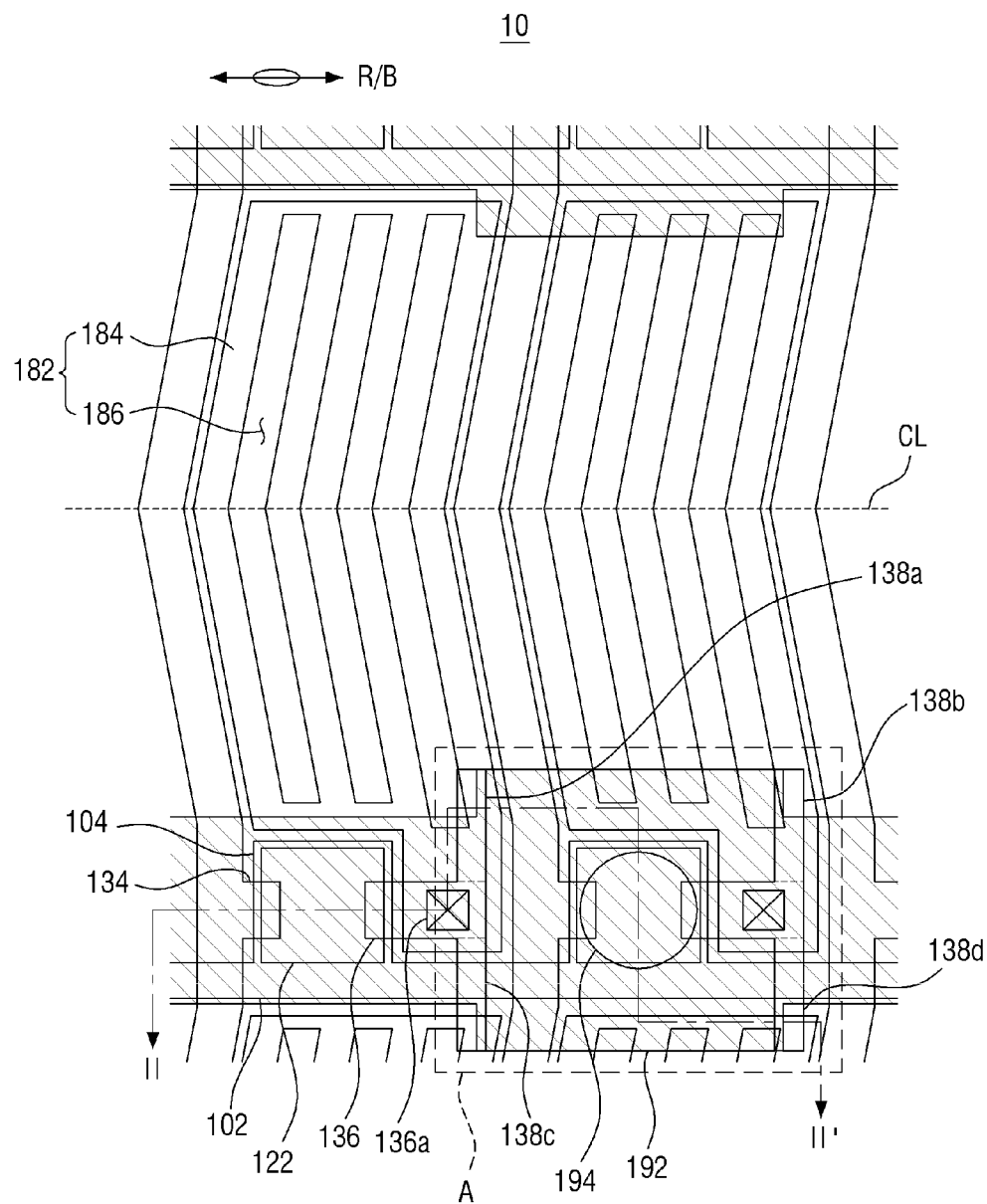

[FIG. 2]
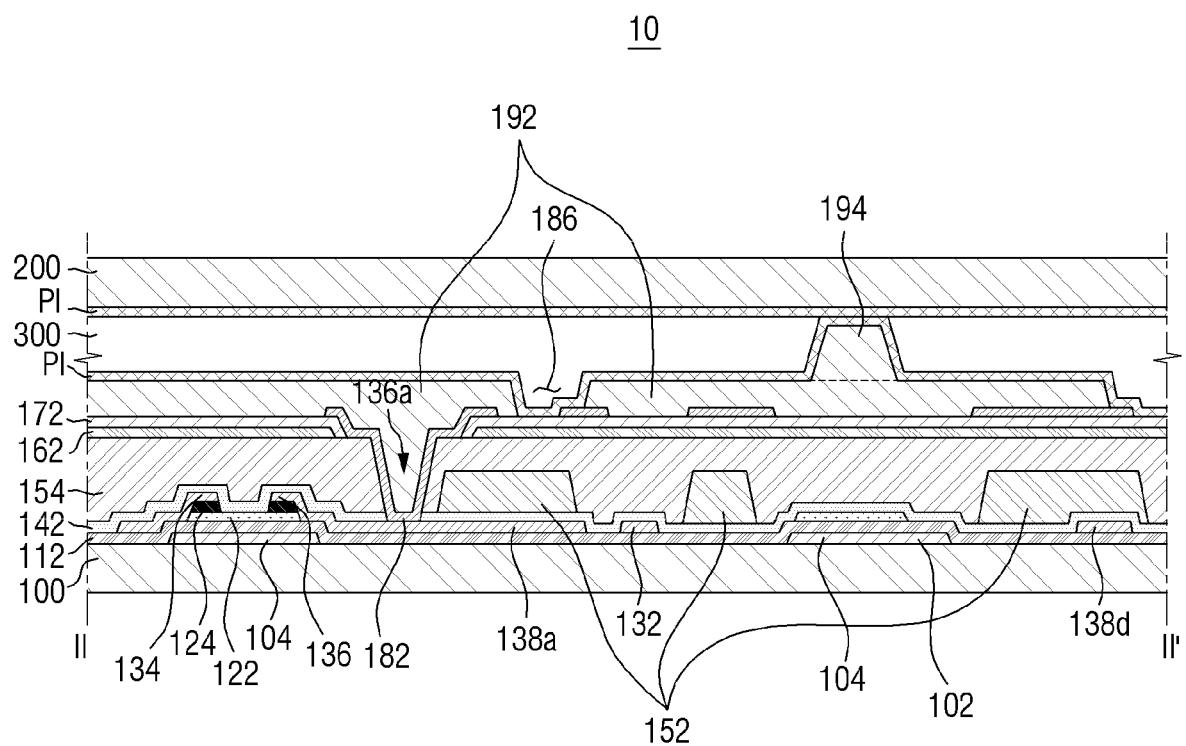

[FIG. 3]
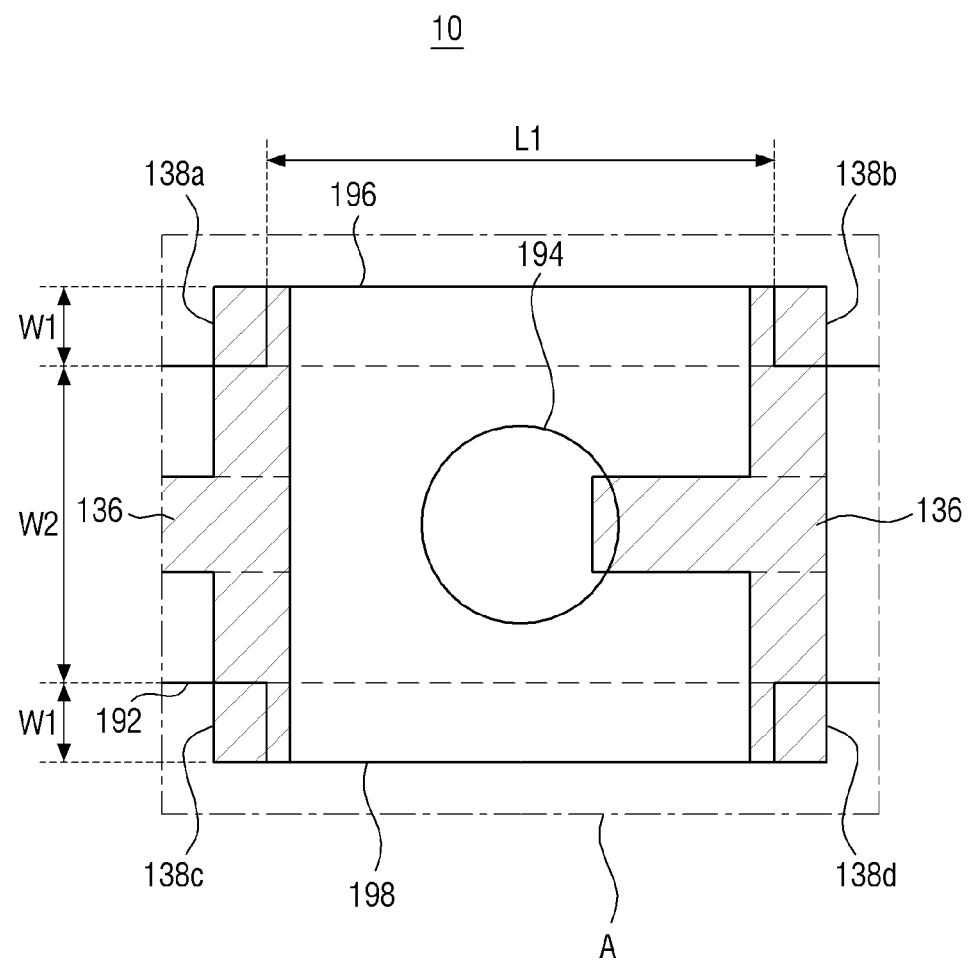

【FIG. 4】
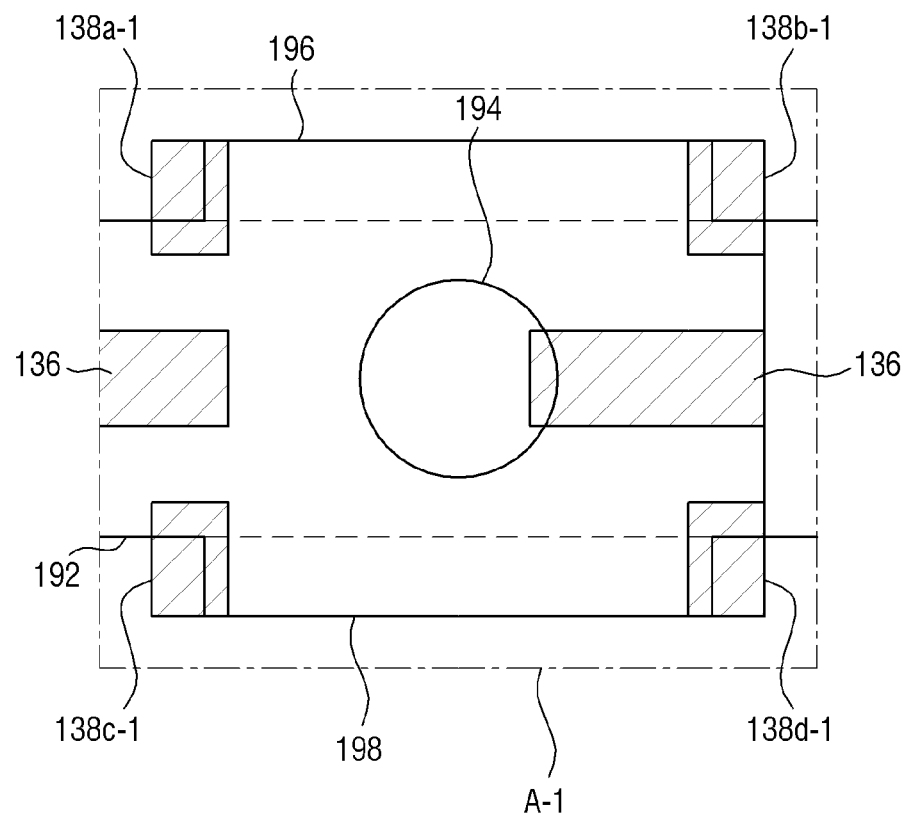

【FIG. 5】
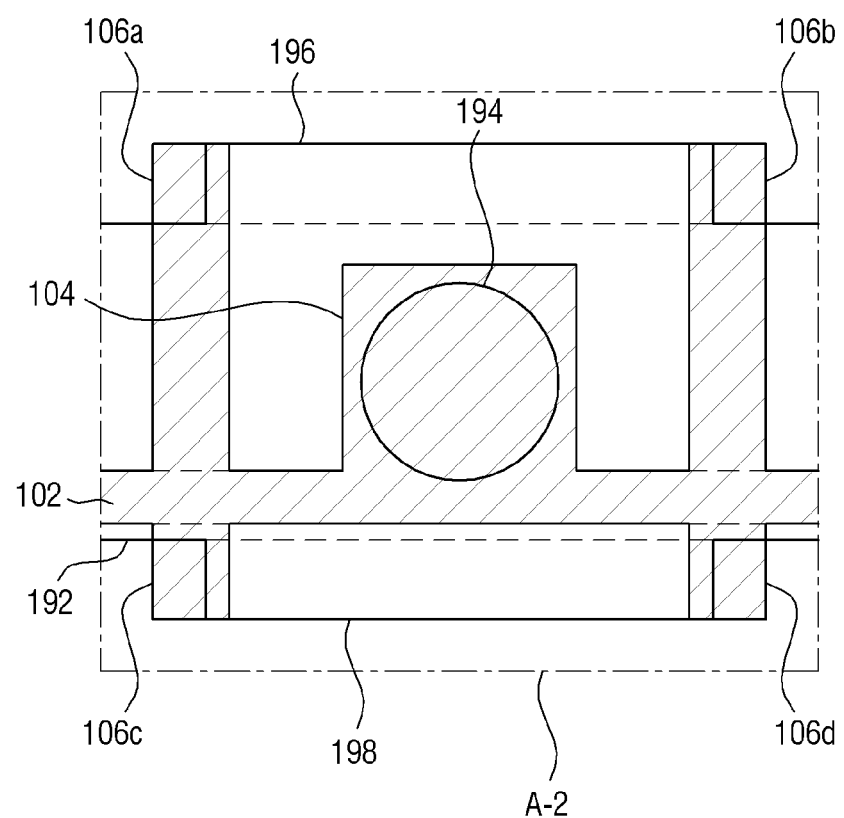

【FIG. 6】
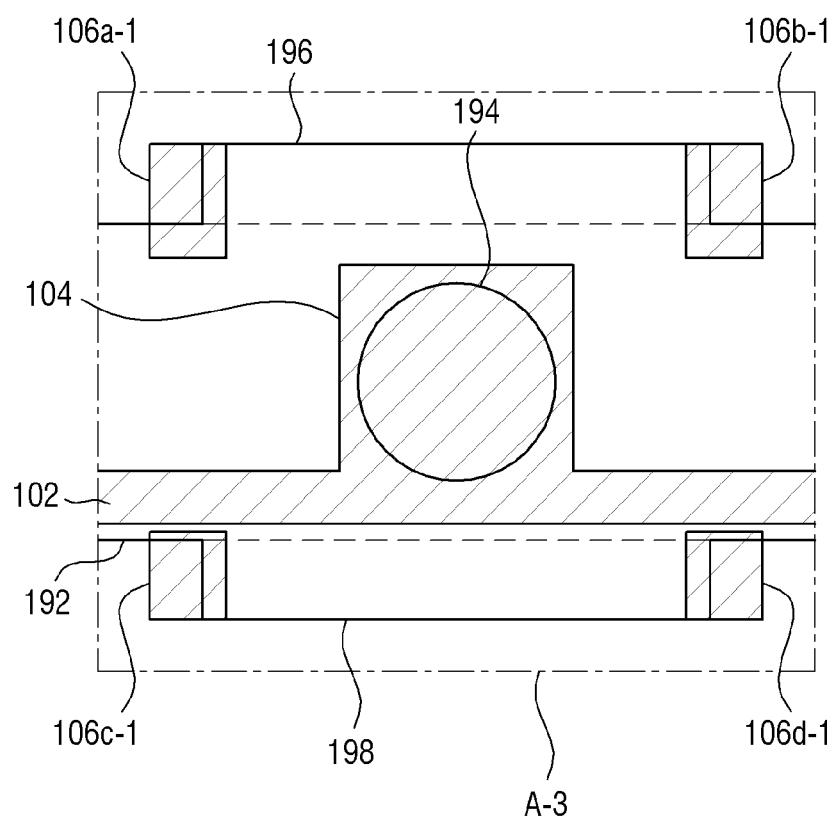

[FIG. 7]
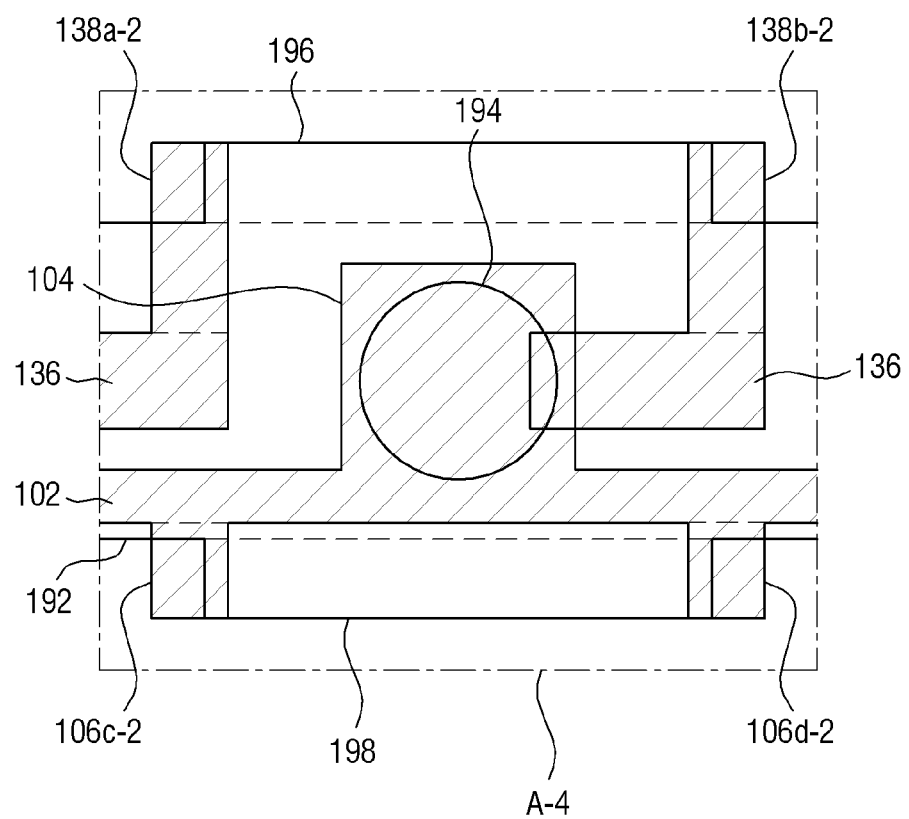

[FIG. 8]
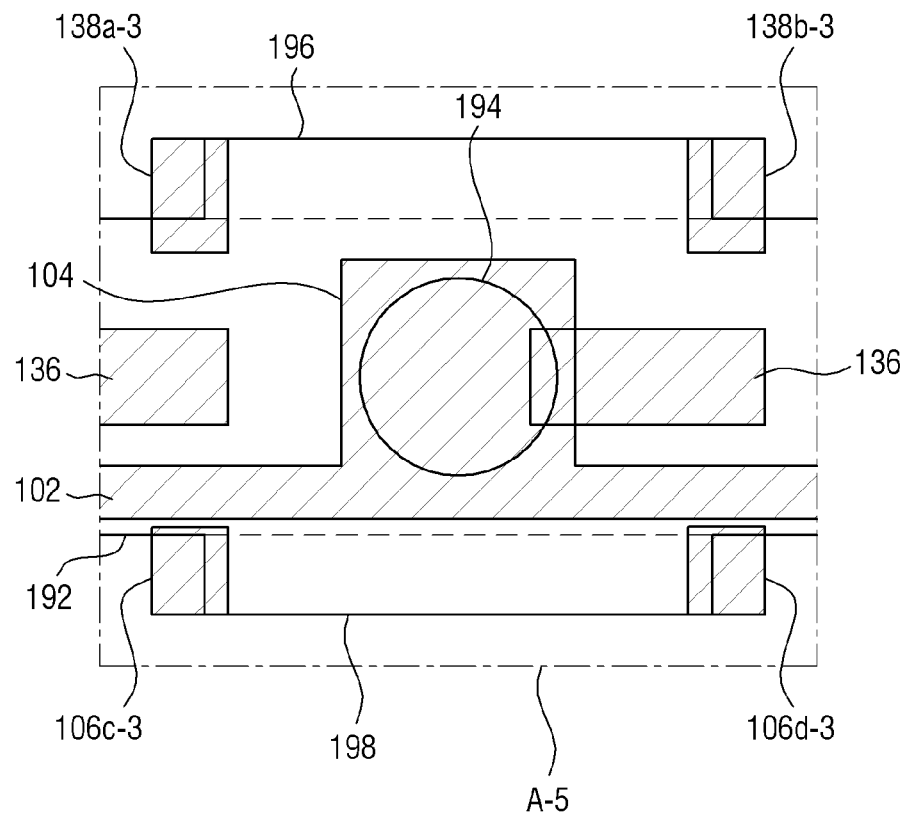

[FIG. 9]
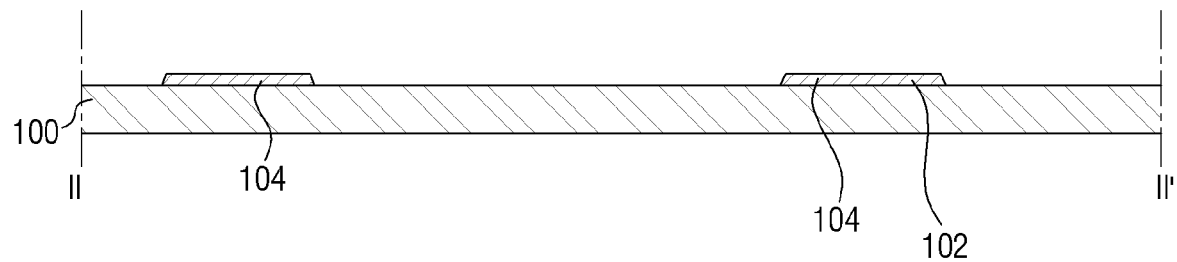
[FIG. 10]
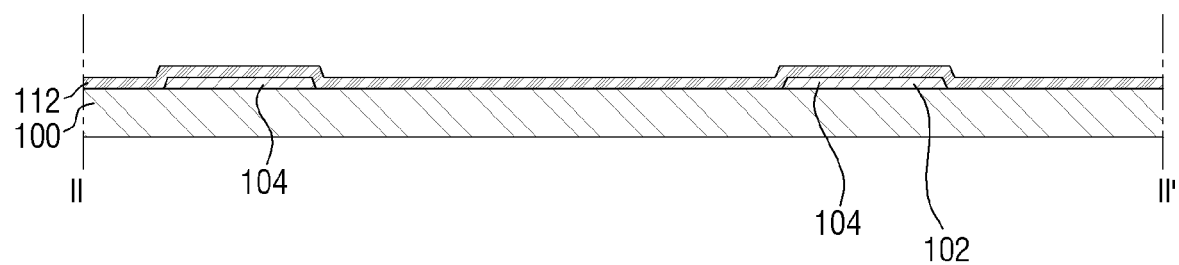
[FIG. 11]
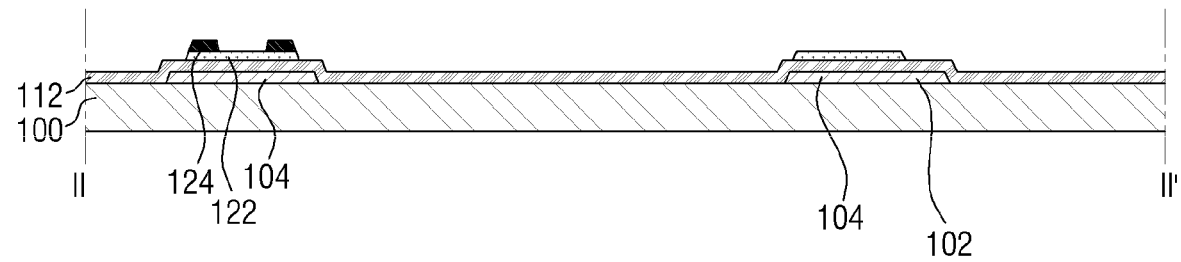

【FIG. 12】
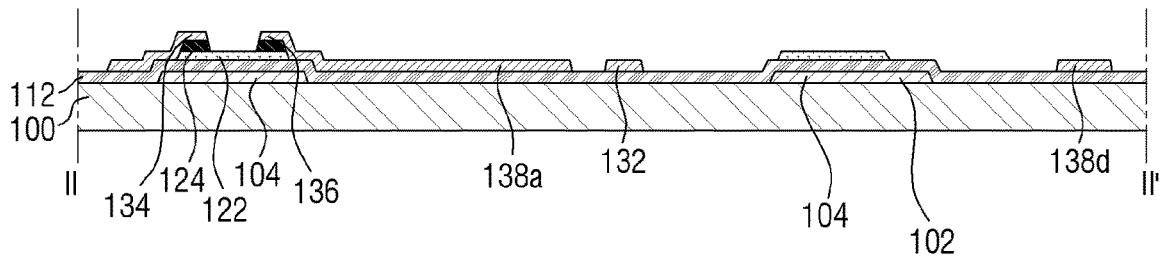
【FIG. 13】
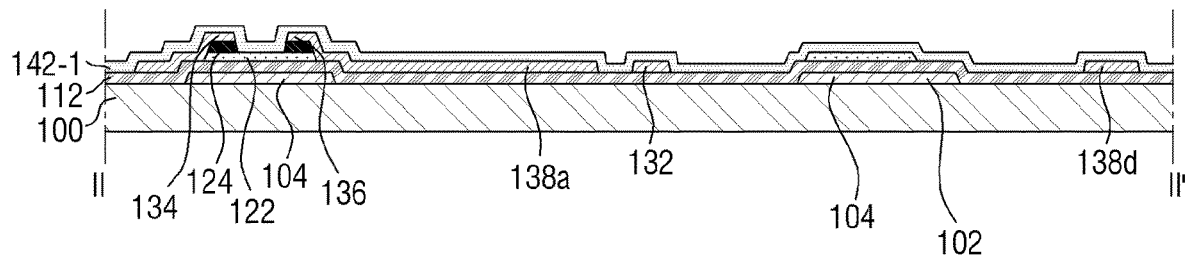
【FIG. 14】
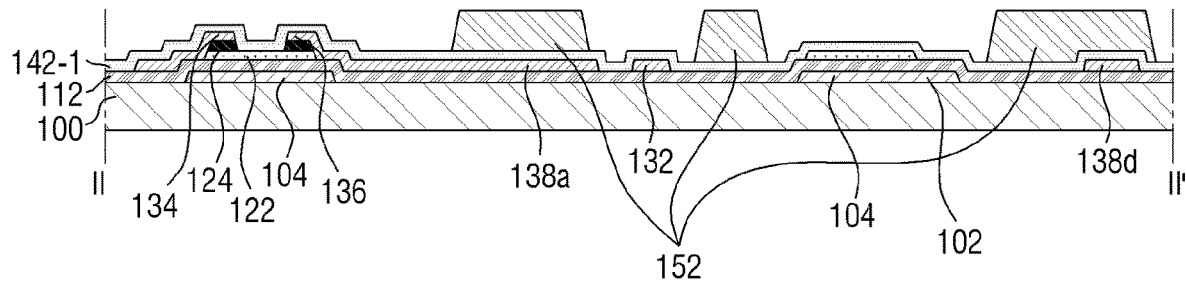

[FIG. 15]
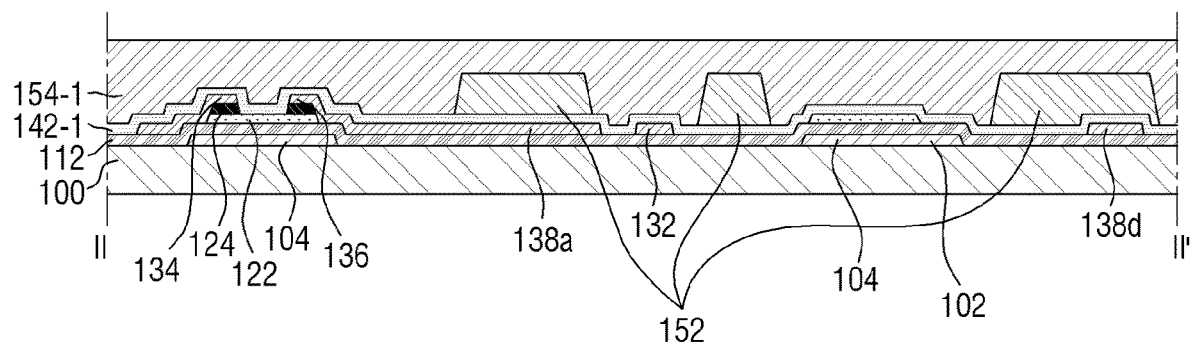
[FIG. 16]
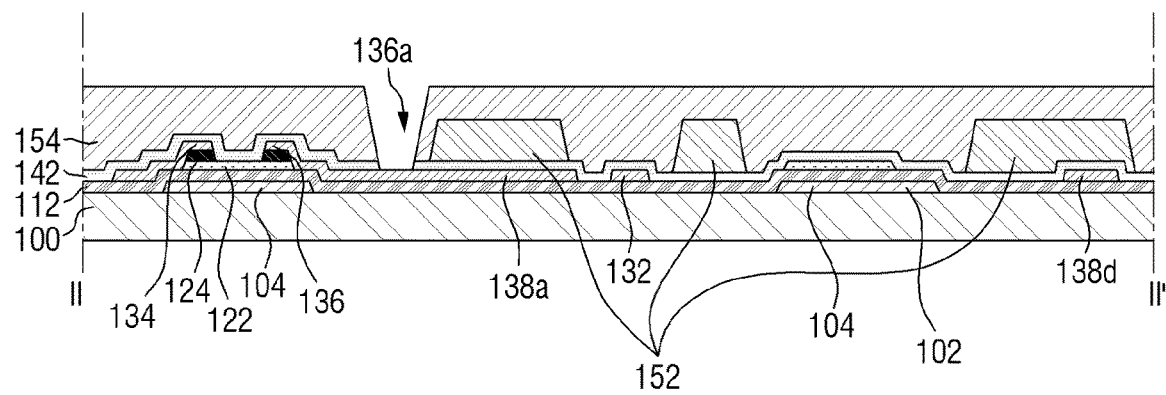

[FIG. 17]
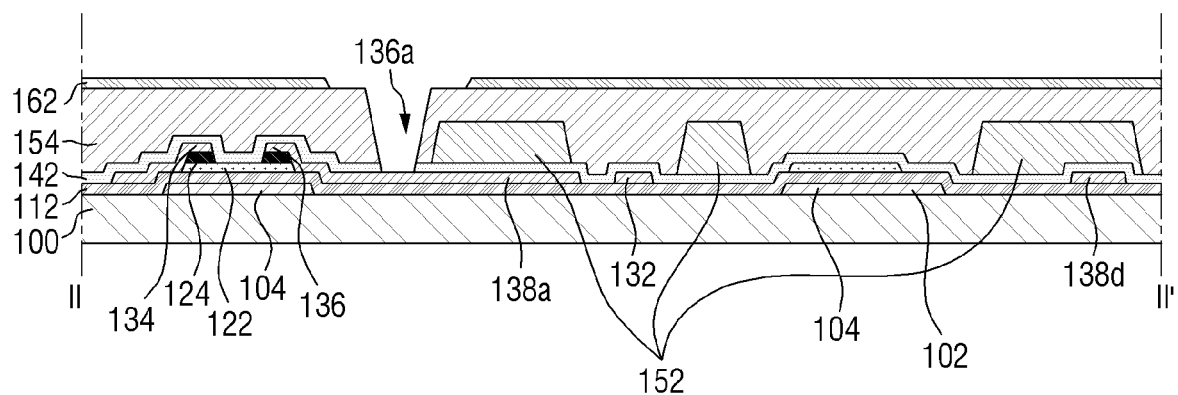
[FIG. 18]
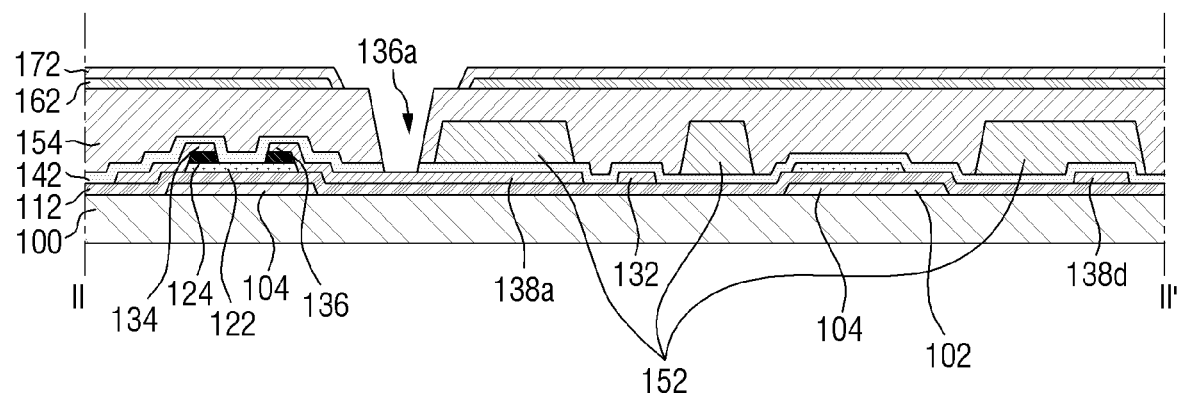

【FIG. 19】
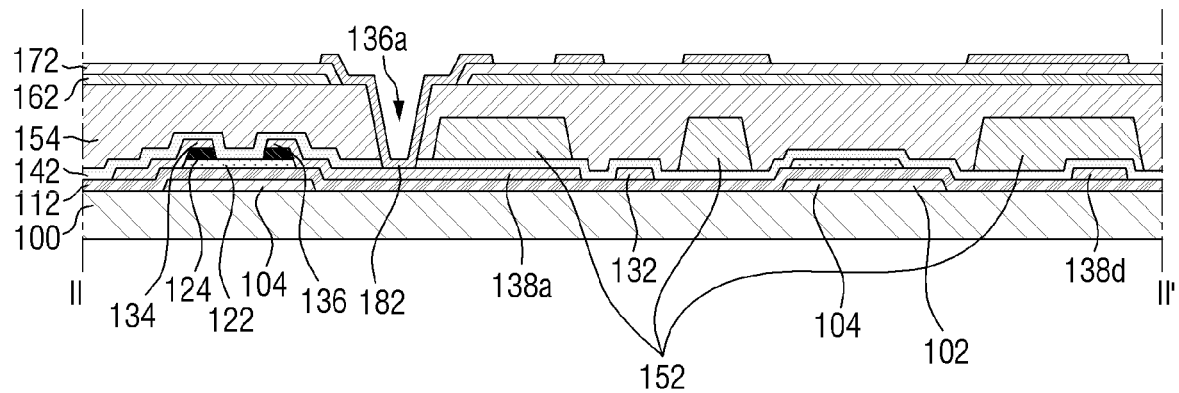
【FIG. 20】
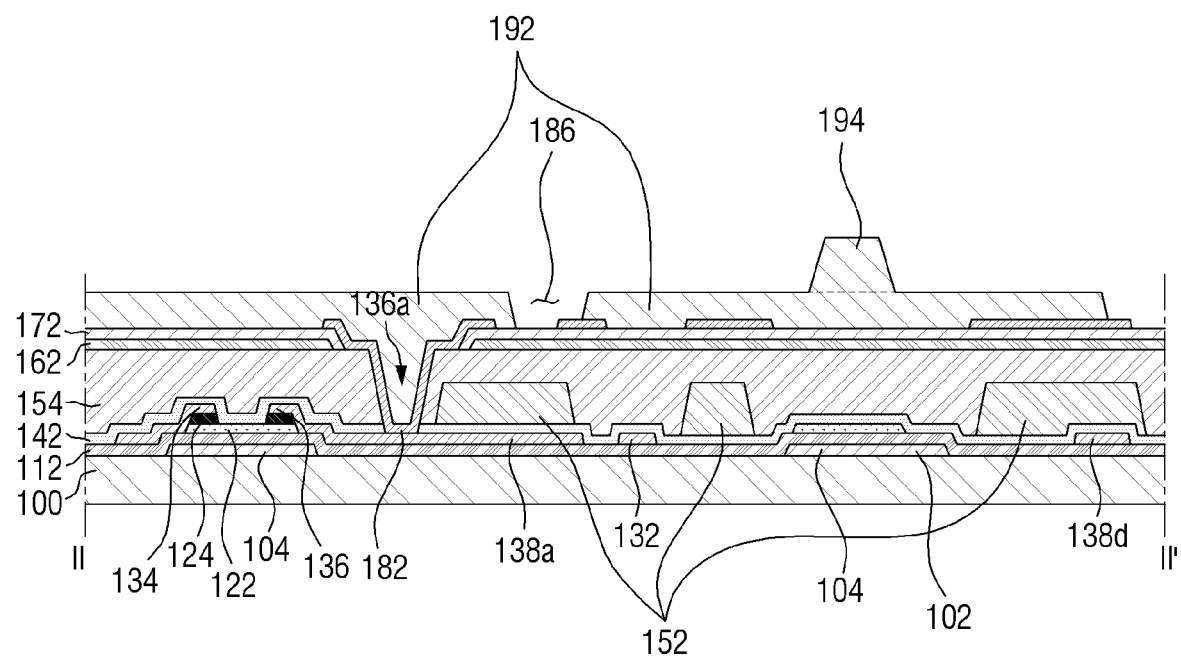

[FIG. 21]
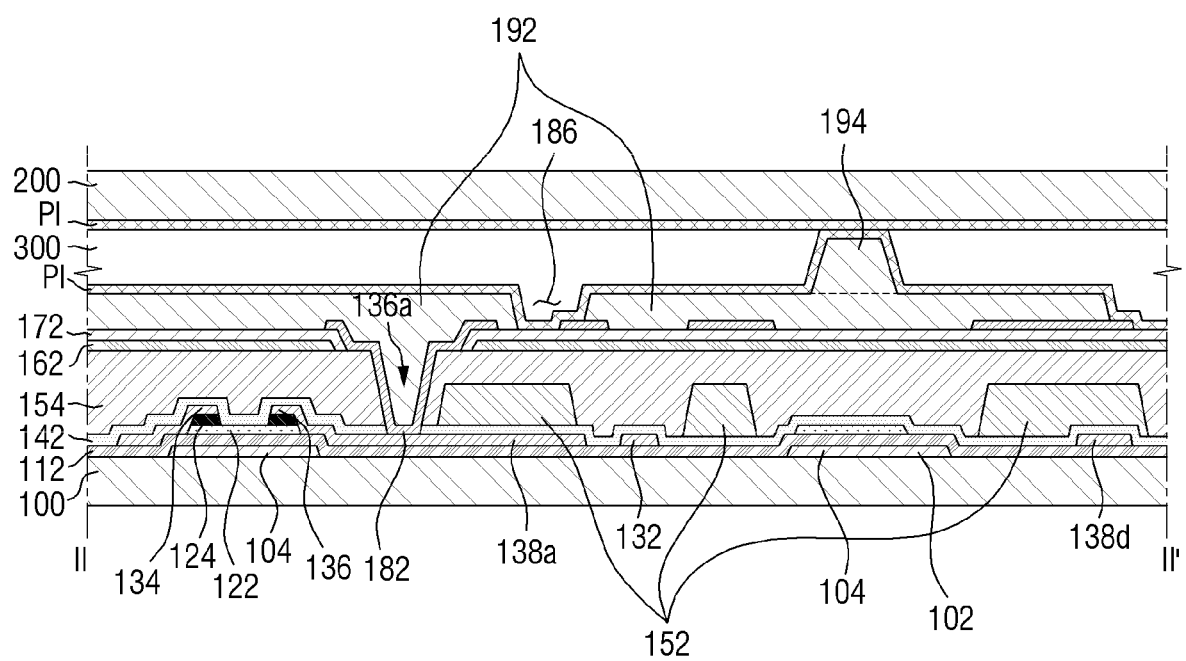

LIQUID CRYSTAL DISPLAY DEVICE AND METHOD OF MANUFACTURING THE SAME

CROSS-REFERENCE TO RELATED APPLICATION

This application claims priority from Korean Patent Application No. 10-2015-0104430 filed on Jul. 23, 2015 in the Korean Intellectual Property Office, the disclosure of which is incorporated herein by reference in its entirety.

BACKGROUND

1. Technical Field

The present inventive concept relates to a liquid crystal display device and a method of manufacturing the same.

2. Description of the Related Art

In general, a liquid crystal display device includes an array substrate, an opposing substrate facing the array substrate, and a liquid crystal layer interposed between the array substrate and the opposing substrate. Recently, a liquid crystal display device having a high light transmittance structure employing a color filter on array (COA) substrate in which a color filter is provided on an array substrate is being developed. In this case, a misalignment may occur in the process of combining the COA substrate and the opposing substrate having a light blocking member provided thereon. To prevent the misalignment, a black matrix on array (BOA) substrate in which a light blocking member is provided on the COA substrate is under development. Furthermore, a black column spacer (BCS) which is formed simultaneously with and of the same material as a column spacer for maintaining a distance between a light blocking pattern and a substrate is being developed.

In a BCS structure, when a panel warps by force applied from an external source, an alignment layer on a surface of an opposing substrate may be scratched by a column spacer, thus causing light leakage. To prevent light leakage, an attached structure in which a width of a light blocking pattern extends to a column spacer may be adopted. When such attached structure is applied, the attached structure may have a boundary region where light leakage may occur because the liquid crystal molecules may not be accurately aligned in that region. A way to reduce or prevent light leakage in the boundary region is desired.

SUMMARY

Aspects of the present inventive concept provide a liquid crystal display device having a structure for preventing light leakage caused by applying an attached structure of a light blocking pattern.

Aspects of the present inventive concept provide a method of manufacturing a liquid crystal display device having a structure for preventing light leakage caused by applying an attached structure of a light blocking pattern.

According to an aspect of the present inventive concept, there is provided a liquid crystal display device having a structure for preventing light leakage caused by applying an attached structure of a light blocking pattern.

According to another aspect of the present inventive concept, there is provided a method of manufacturing a liquid crystal display device having a structure for preventing light leakage caused by applying an attached structure of a light blocking pattern.

However, effects of the present inventive concept are not restricted to the exemplary embodiments set forth herein and more diverse effects are included in this description.

According to an aspect of the present invention, there is provided a liquid crystal display device that includes: a first substrate and a second substrate facing each other; a liquid crystal layer interposed between the first substrate and the second substrate; a column spacer disposed on the first substrate and maintaining a gap between the first substrate and the second substrate; a light blocking pattern disposed on the first substrate and including an extended portion formed around the column spacer; and light blocking metal overlapped with at least a part of a region adjacent to and outside of a boundary of the extended portion that is not parallel to an alignment direction of liquid crystal molecules.

The light blocking metal may be overlapped with at least a part of the boundary that is not parallel to an alignment direction of liquid crystal molecules among boundaries of the extended portion.

There may be a gate wiring and a data wiring disposed on the first substrate, wherein at least a part of the light blocking metal is disposed at a same level as at least one of the gate wiring and the data wiring.

The data wiring may include a drain electrode, and at least a part of the light blocking metal may be disposed at a same level as the data wiring and formed integrally with the drain electrode.

At least a part of the light blocking metal may be disposed at a same level as the data wiring and separated from the data wiring.

At least a part of the light blocking metal may be disposed at a same level as the gate wiring and formed integrally with the gate wiring.

At least a part of the light blocking metal may be disposed at a same level as the gate wiring and separated from the gate wiring.

The extended portion may have a square shape.

The extended portion may include a first extended portion disposed at one side of the column spacer and a second extended portion disposed across the column spacer from the first extended portion.

There may be a gate line and a data line disposed on the first substrate and intersecting each other so as to define a unit pixel, wherein the light blocking pattern extends in a same direction as the gate line, and the extended portion protrudes in a direction non-parallel to the direction of the gate line.

The alignment direction of liquid crystal molecules may be the same as the direction in which the gate line extends.

The light blocking pattern and the column spacer may be formed integrally.

According to another aspect of the present invention, there is provided a method of manufacturing a liquid crystal display device, comprising: forming a gate wiring on a first substrate; forming a data wiring on the first substrate; forming light blocking metal on the first substrate; and forming a light blocking pattern and a column spacer on the gate wiring and the data wiring; wherein the light blocking pattern includes an extended portion formed around the column spacer, and the light blocking metal is overlapped with at least a part of a region adjacent to and outside of a boundary of the extended portion that is not parallel to an alignment direction of liquid crystal molecules.

The light blocking metal may be overlapped with at least a part of the boundary of the extended portion that is not parallel to an alignment direction of liquid crystal molecules.

At least a part of the light blocking metal may be formed simultaneously with at least one of the gate wiring and the data wiring.

The data wiring may include a drain electrode, and at least a part of the light blocking metal is formed integrally with the drain electrode at a level same as the data wiring.

At least a part of the light blocking metal may be formed separately from the data wiring at a level same as the data wiring.

At least a part of the light blocking metal may be formed integrally with the gate wiring at a level same as the gate wiring.

At least a part of the light blocking metal may be formed separately from the gate wiring at a level same as the gate wiring.

The extended portion may have a square shape.

BRIEF DESCRIPTION OF THE DRAWINGS

FIG. 1 is a layout diagram of a liquid crystal display device according to an embodiment of the present inventive concept;

FIG. 2 is a cross-sectional view taken along line I1-I1' of FIG. 1;

FIG. 3 is an enlarged diagram of region A of FIG. 1;

FIG. 4 is an enlarged diagram of a region of a liquid crystal display device corresponding to region A of FIG. 1 according to another embodiment of the present inventive concept;

FIG. 5 to FIG. 8 are enlarged diagrams of a region of a liquid crystal display device corresponding to region A of FIG. 1 according to still another embodiment of the present inventive concept; and FIG. 9 to FIG. 21 are diagrams illustrating intermediate process steps of a method of manufacturing a liquid crystal display device according to an embodiment of the present inventive concept.

DETAILED DESCRIPTION OF THE EMBODIMENTS

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. "Exemplary," as used herein, is intended to mean examples that may or may not be preferred embodiments.

The description that one element is connected to or coupled to another element includes both a case where the one element is directly connected to another element and a case where a third element is interposed between the elements. However, the description that one element is directly connected or directly coupled to another element indicates that there is no intervening element between the elements. The term "and/or" includes any and all combinations of one or more of the associated listed items.

A singular expression in the present specification also includes a plural expression. The terms "comprise" and/or includes "comprising" do not exclude the possibility of existence or addition of one or more other components, steps, operations, and/or devices.

Embodiments of the present inventive concept now will be described with reference to the drawings.

FIG. 1 is a layout diagram of a liquid crystal display device according to an embodiment of the present inventive concept. FIG. 2 is a cross-sectional view taken along line II-II' of FIG. 1. FIG. 3 is an enlarged diagram of region A of FIG. 1.

Referring to FIG. 1 to FIG. 3, a liquid crystal display device 10 according to an embodiment of the present inventive concept may include a first substrate 100 and a second substrate 200 facing each other, and a liquid crystal layer 300 interposed between the first substrate 100 and the second substrate 200.

The first substrate 100 and the second substrate 200 may include insulation materials such as transparent glass, quartz, ceramic, silicon or transparent plastics, which may be selected appropriately by a person skilled in the art as needed. The first substrate 100 and the second substrate 200 may face each other.

In some embodiments, the first substrate 100 and the second substrate 200 may be flexible. That is, the first substrate 100 and the second substrate 200 may be rolled, folded, bent and so on.

A plurality of gate wirings 102 and 104 and data wirings 132, 134 and 136 may be disposed on the first substrate 100.

The gate wirings 102 and 104 may include the plurality of gate lines 102 and the plurality of gate electrodes 104. The data wirings 132, 134 and 136 may include a plurality of data lines 132, a plurality of source electrodes 134 and a plurality of drain electrodes 136.

The gate wirings 102 and 104 and the data wirings 132, 134 and 136 may be made of aluminum (Al) or aluminum-based metal such as aluminum alloy, silver (Ag) or silver-based metal such as silver alloy, copper (Cu) or copper-based metal such as copper alloy, molybdenum (Mo) or molybdenum-based metal such as molybdenum alloy, chrome (Cr), titanium (Ti), tantalum (Ta) and the like. The gate wirings 102 and 104 and the data wirings 132, 134 and 136 may have a multi-layer structure including two conductive layers (not shown) having different physical properties. For example, one conductive layer may be made of aluminum-based metal, silver-based metal, copper-based metal and the like, and the other conductive layer may be made of molybdenum-based metal, chrome, titanium, tantalum and the like. Examples of such combination may include a lower chrome layer and an upper aluminum layer, and a lower aluminum layer and an upper molybdenum layer. However, the present disclosure is not limited thereto, and the gate wirings 102 and 104 and data wirings 132, 134 and 136 may be made of various metals and conductors.

Each of the gate lines 102 may extend in a first direction, for example, in a horizontal direction along a boundary of a pixel, and each of the data lines 132 may extend in a second direction, for example, in a vertical direction along the boundary of a pixel. The gate lines 102 and the data lines 132 may intersect each other so as to define a pixel region. That is, the pixel region may be defined as a region enclosed by the gate lines 102 and the data lines 132.

In some embodiments, the data lines 132 may be periodically bent to improve transmittance, as shown in FIG. 1. However, this is just an example, and the shape of the data lines 132 is not limited thereto.

At least one gate electrode 104 may be connected to each gate line 102 in each pixel. The gate electrode 104 may be branched toward a semiconductor layer 122 from the gate line 102, or formed by extending the gate line 102. However, the present disclosure is not limited thereto, and the gate electrode 104 may be defined in a region overlapped with the semiconductor layer 122 on a path extending from the gate line 102.

At least one source electrode 134 may be connected to each data line 132 in each pixel. The source electrode 134 may be branched toward the semiconductor layer 122 from the data lines 132, or formed by extending the data lines 132. However, the present disclosure is not limited thereto, and the source electrode 134 may be defined in a region overlapped with the semiconductor layer 122 on a path extending from the data lines 132. For example, the source electrode 104 may be provided in substantially the same line as the data line 132 rather than being protruded from the data line 132. The drain electrode 136 may be spaced apart from the source electrode 104 with the semiconductor layer 122 interposed therebetween, and may be electrically connected to a pixel electrode 182 through a contact hole 136a penetrating through a first passivation layer 142 and a second passivation layer 172.

A gate insulation layer 112 may be interposed between the gate wirings 102 and 104 and data wirings 132, 134 and 136. In one embodiment, the gate insulation layer 112 may be disposed on the gate wirings 102 and 104, and the data wirings 132, 134 and 136 may be disposed on the gate insulation layer 112. The gate insulation layer 112 may be formed of, for example, silicon nitride (SiNx), silicon oxide (SiO$_2$), silicon oxynitride (SiON) or a laminate film thereof. The gate insulation layer 112 may serve to maintain insulation between the gate wirings 102 and 104 and conductive thin layers such as the data lines 132 provided above the gate wirings 102 and 104.

The semiconductor layer 122 may be disposed on the gate insulation layer 112, and may be made of, for example, hydrogenated amorphous silicon, polycrystalline silicon or the like. The semiconductor layer 122 may be partially overlapped with the gate electrode 104. The semiconductor layer 122 may constitute a thin film transistor together with the gate electrodes 104, the source electrodes 134 and the drain electrodes 136.

The semiconductor layer 122 may have various shapes such as an island or a line, and FIG. 3 illustrates an example of the semiconductor layer 122 having an island shape, but the present disclosure is not limited thereto. When the semiconductor layer 122 is formed into a line shape, although not shown in the drawings, the semiconductor layer 122 may be overlapped with the data wirings 132, 134 and 136.

An ohmic contact layer 124 made of n+ hydrated amorphous silicon or the like, which is highly doped with n-type impurities, may be disposed on the semiconductor layer 122. The ohmic contact layer 124 may be interposed between the semiconductor layer 122 below the ohmic contact layer 124 and the source electrode 134 and the drain electrode 136 above the ohmic contact layer 124 so as to reduce contact resistance. The ohmic contact layer 124 may have various shapes such as an island or a line similarly to the semiconductor layer 122. When the semiconductor layer 122 has an island shape, the ohmic contact layer 124 may also have an island shape, and when the semiconductor layer 122 has a line shape, the ohmic contact layer 124 may also have a line shape. Unlike the semiconductor layer 122, since portions of the ohmic contact layer 124 corresponding to the source electrode 134 and the drain electrode 136 which face and are spaced apart from each other are separated, the semiconductor layer 122 below the ohmic contact layer 124 may be exposed. A channel may be formed in a portion of the first semiconductor layer 122 corresponding to the space between the source electrode 134 and the drain electrode 136 spaced apart from each other.

When a gate on signal is applied to the gate electrode 104 and a channel is formed in the semiconductor layer 122, a thin film transistor is turned on and the drain electrode 136 may receive a data signal from the source electrode 134 and transmit the received data signal to a pixel electrode 182.

The first passivation layer 142 may be disposed on the data wirings 132, 134 and 136 and the exposed semiconductor layer 122. A contact hole 136a which exposes at least a part of the drain electrode 136 may be formed in the first passivation layer 142 and an organic layer 154 which will be discussed later. At least a part of the drain electrode 136 exposed through the contact hole 136a may contact the pixel electrode 182. Thus, the drain electrode 136 and the pixel electrode 182 may be electrically connected with each other.

The first passivation layer 142 may include, for example, inorganic insulation materials such as silicon nitride or silicon oxide or materials such as a-Si:C:O and a-Si:O:F formed through a plasma enhanced chemical vapor deposition (PECVD).

The organic layer 154 may be disposed on the first passivation layer 142. The organic layer 154 may include a material which is excellent in planarizing characteristics and has photosensitivity. The organic layer 154 may have the contact hole 136a which exposes at least a part of the drain electrode 136.

In some embodiments, a color filter 152 may be interposed between the organic layer 154 and the first passivation layer 142 as shown in FIG. 2. The color filter 152 may include a red (R) color filter, a green (G) color filter and a blue (B) color filter. The R, G and B color filters may be formed in the respective pixels so as to form R, G and B pixels. The color filter 152 may be disposed to be overlapped with the pixel electrode 182. The color filter 152 may include a photosensitive organic material including a pigment. The organic layer 154 may be disposed on the color filter 152 so as to planarize steps among the R, G and B color filters. The color filter 152 may be covered by the organic layer 154. That is, the color filter 152 may be covered by the organic layer 154 such that no portion of the color filter 152 may be exposed. However, this is just an example, and the present disclosure is not limited to such structure.

A common electrode 162 may be disposed on the organic layer 154. The common electrode 162 may receive a common voltage applied thereto and cooperate with the pixel electrode 182 to generate an electric field, thereby controlling an alignment direction of liquid crystal molecules in the liquid crystal layer 300. The common electrode 162 may include an aperture for exposing an area where the contact hole 136a is formed. That is, at least a part of the drain electrodes 136 may be exposed through the aperture formed in the common electrode 162. The common electrode 162 may be formed into a single body throughout the pixel region enclosed by the gate line 102 and the data line 132, excluding the aperture. The common electrode 162 may be made of a transparent conductive material such as indium tin oxide (ITO) or indium zinc oxide (IZO), but the present disclosure is not limited thereto.

The second passivation layer 172 may be disposed on the common electrode 162 and the organic layer 154. The second passivation layer 172 may include an aperture for exposing an area where the contact hole 136a is formed. That is, at least a part of the drain electrode 136 may be exposed through the aperture formed in the second passivation layer 172. The second passivation layer 172 may be an inorganic insulation material. For example, the second passivation layer 172 may include silicon nitride, silicon oxide and the like. The second passivation layer 172 may be interposed between the pixel electrode 182 and the common electrode 162 so as to insulate the pixel electrode 182 and the common electrode 162 from each other.

The pixel electrode 182 may be disposed on the second passivation layer 172 in every unit pixel. At least a part of the pixel electrode 182 may be overlapped with the common electrode 162. A part of the pixel electrode 182 may be disposed in the contact hole 136a. The part of the pixel electrode 182 disposed in the contact hole 136a may contact the drain electrode 136 so as to be electrically connected thereto.

In some embodiments, the pixel electrode 182 may include a plurality of branched finger electrodes 184 overlapped with the common electrode 162, and a slit 186 may be formed between neighboring branched finger electrodes 184. The branched finger electrodes 184 may tilt at an oblique angle with respect to a vertical direction in the drawings, and may be bent at a horizontal central line (CL) of the pixel electrode 182 Thus, the pixel electrode 182 may be divided into a plurality of domains in which the branched finger electrodes 184 are tilted in different directions. For example, the branched finger electrode 184 above the horizontal central line may extend in a right upward direction and the branched finger electrode 184 below the horizontal central line may extend in a right downward direction. The branched finger electrodes 184 of the pixel electrode 182 may extend substantially in parallel to the data line 132. However, the shape of the pixel electrode 182 shown in FIG. 1 is just an example, and the present disclosure is not limited thereto, and the shape of the slit 186 may vary according to the need of a person skilled in the art. For example, the pixel electrode 182 may include a plurality of empty slits 186 having various shapes such as a fish-bone shape.

When a data voltage is applied to the pixel electrode 182 through the contact hole 136a, an electric field is generated in the direction from the pixel electrode 182 toward the common electrode 162 below the pixel electrode 182. That is, the pixel electrode 182 may cooperate with the common electrode 162 to generate an electric field, which rotates the liquid crystal molecules in the liquid crystal layer 300. The pixel electrode 182 may include a transparent conductive material such as ITO or IZO, but the present disclosure is not limited thereto.

Meanwhile, in other embodiments, the common electrode 162 may be formed into a plane shape. In this case, the common electrode 162 may include a plurality of branched finger electrodes (not shown) overlapped with the pixel electrode 182. However, this is just an example, and the pixel electrode 182 and the common electrode 162 may have various other structures and arrangements.

A light blocking pattern 192 may be formed on the second passivation layer 172 and the pixel electrode 182. The light blocking pattern 192 may serve to prevent light leakage. The light blocking pattern 192 may be disposed in a thin film transistor region and a non-pixel region (between pixels, and regions of gate lines and data lines).

In some embodiments, the light blocking pattern 192 may be implemented into the shape extending in the direction of extending the gate line 102 as shown in FIG. 1. However, this is an example, and the light blocking pattern 192 may further be disposed in a region of the data lines 132 so as to form a lattice shape in other embodiments.

In some embodiments, a part of the light blocking pattern 192 may be disposed in the contact hole 136a as shown in FIG. 1. However, this is an example, and the present disclosure is not limited to such structure.

The light blocking pattern 192 may be made of a black organic polymer material including black dye or pigment, or metal (metal oxide) such as chrome or chrome oxide.

A column spacer 194 may serve to maintain a gap between the first substrate 100 and the second substrate 200, and in some embodiments, the column spacer 194 may have an end contacting the second substrate 200 as shown in FIG. 2. However, this is just an example, and the end of the column spacer 194 may be spaced apart from the second substrate 200 by a predetermined distance.

Although not shown in the drawings, the column spacer 194 may include a plurality of column spacers having different stepped portions. For example, the column spacer 194 may include a main column spacer having a relatively higher stepped portion and a sub column spacer having a relatively lower stepped portion. In this case, the gap between the first substrate 100 and the second substrate 200 may be maintained firstly by the main column spacer, and when the main column spacer may not function correctly, the gap between the first substrate 100 and the second substrate 200 may be maintained secondly by the sub column spacer.

The column spacer 194 may be formed into a region corresponding to a thin film transistor as shown in FIG. 1 and FIG. 2. At least apart of the column spacer 194 may be overlapped with the gate wirings 102 and 104. However, this is merely an example, and the arrangement of the column spacer 194 is not limited thereto.

An alignment layer PI may be disposed on one surface of the first substrate 100 and one surface of the second substrate 200, both one surfaces facing the liquid crystal layer 300. That is, the alignment layer PI for alignment of the liquid crystal layer 300 may be disposed on the pixel electrode 182, the second passivation layer 172, the light blocking pattern 192 and the column spacer 194.

In the embodiment described with reference to FIG. 1, a rubbing direction R/B of the alignment layer PI is illustrated as being a horizontal direction with respect to FIG. 1, which is the direction in which the gate line 102 extends, but the present disclosure is not limited thereto. In the embodiment described with reference to FIG. 1, since the rubbing direction R/B of the alignment layer PI is illustrated as being a horizontal direction on the drawing, i.e., the direction in which the gate line 102 extends, the liquid crystal molecules may be aligned to have their major axes directed toward the rubbing direction. That is, the alignment direction of the liquid crystal molecules may be the same as the direction in which the gate line extends.

The liquid crystal layer 300 including liquid crystal molecules having positive or negative dielectric anisotropy may be interposed between the first substrate 100 and the second substrate 200.

In some embodiments, the column spacer 194 may be made of the same material as that of the light blocking pattern 192. The column spacer 194 and the light blocking pattern 192 may be simultaneously formed through a single patterning process using a halftone mask or slit mask exposure. The column spacer 194 and the light blocking pattern 192 may be simultaneously formed of the same material. When the column spacer 194 and the light blocking pattern 192 are simultaneously formed, and when the panel warps by force applied from an external source, the alignment layer PI disposed on the second substrate 200 may be scratched by the column spacer 194, causing light leakage to occur.

Thus, the light blocking pattern 192 of the liquid crystal display device 10 according to an embodiment of the present inventive concept may include extended portions 196 and 198 for preventing light leakage caused by the scratch described above. The extended portions 196 and 198 may protrude toward a periphery from the column spacer 194. In other words, the extended portions 196 and 198 may be branched from the light blocking pattern 192 about the column spacer 194.

The extended portions 196 and 198 may be formed simultaneously and integrally with the light blocking pattern 192 through a single patterning process. The extended portions 196 and 198 may be made of a material same as that of the light blocking pattern 192. That is, the light blocking pattern 192, the extended portions 196 and 198 and the column spacer 194 may be integrally formed of the same material through a single patterning process.

The arrangement and size of the extended portions 196 and 198 may be appropriately determined according to a positional relation between the light blocking pattern 192 and the column spacer 194. For example, when the column spacer 194 is disposed at the center of a width W2 of the light blocking pattern 192 as shown in FIG. 1 and FIG. 3, the extended portions 196 and 198 may be protruded/branched respectively in one direction and the other direction from the light blocking pattern 192. That is, the extended portions 196 and 198 may have a first extended portion 196 protruding in one direction from the light blocking pattern 192, and a second extended portion 198 protruding in the other direction opposite to the one direction from the light blocking pattern 192. A width W1 and a length L1 of the first extended portion 196 and a width W1 and a length L1 of the second extended portion 198 may be the same. In this case, the width W2+2W1 of a portion of the light blocking pattern 192 where the extended portions 196 and 198 are formed may be wider than the width W2 of a portion of the light blocking pattern 192 where the extended portions 196 and 198 are not formed. However, this is just an example, and either the first extended portion 196 or the second extended portion 198 may be provided or the first extended portion 196 and the second extended portion 198 may have sizes different from each other according to a positional relation between the light blocking pattern 192 and the column spacer 194.

In some embodiments, the extended portions 196 and 198 may have a square shape in a plane as shown in FIG. 3. However, this is just one example, and the shape of the extended portions 196 and 198 in a plan view may be a polygon, a circle and the like.

Meanwhile, since the extended portions 196 and 198 may be protruded/branched from the light blocking pattern 192, the extended portions 196 and 198 may have a part of the boundary that is not parallel to an alignment direction of liquid crystal molecules. The liquid crystal molecules may not be smoothly controlled in a region adjacent to the part of the boundary that is not parallel to an alignment direction of liquid crystal molecules, causing light leakage to occur.

Thus, the liquid crystal display device 10 according to an embodiment of the present inventive concept may include light blocking metals 138*a*, 138*b*, 138*c* and 138*d* for preventing light leakage caused by the extended portions 196 and 198. The light blocking metals 138*a*, 138*b*, 138*c* and 138*d* may be overlapped with at least a part of the region adjacent to the outside of the boundary that is not parallel to an alignment direction of liquid crystal molecules among the boundaries of the extended portions 196 and 198, thus preventing light leakage caused when the liquid crystal molecules are not smoothly controlled (e.g., exactly aligned) in the region adjacent to the part of the boundary that is not parallel to an alignment direction of the liquid crystal molecules among the boundaries of the extended portions 196 and 198.

For example, referring to FIG. 1 and FIG. 3, when the extended portions 196 and 198 have a square shape viewed in a plane as shown in FIG. 3 and the rubbing direction R/B of the alignment layer PI is a horizontal direction (that is, the direction of the gate line) in FIG. 1, the light blocking metals 138*a*, 138*b*, 138*c* and 138*d* may be overlapped with the region adjacent to the outside of the part of the boundary that is not parallel to an alignment direction of liquid crystal molecules among the boundaries of the extended portions 196 and 198. In other words, that is, the boundary extending in a vertical direction on the drawing among the boundaries of the extended portions 196 and 198. The term "outwards" as used herein may mean outside of the extended portions 196 and 198. The term "adjacent region" as used herein may mean a region within approximately 10 um from the aforementioned boundary. More specifically, the light blocking metals 138*a*, 138*b*, 138*c* and 138*d* may include a first light blocking metal 138*a* overlapped with the region adjacent to the outside (that is, to the left side on the drawing) of the left boundary among the boundaries of the first extended portion 196, a second light blocking metal 138*b* overlapped with the region adjacent to the outside (that is, to the right side on the drawing) of the right boundary among the boundaries of the first extended portion 196, a third light blocking metal 138*c* overlapped with the region adjacent to the outside of the left boundary among the boundaries of the second extended portion 198, and a fourth light blocking metal 138*d* overlapped with the region adjacent to the outside of the right boundary among the boundaries of the second extended portion 198.

In some embodiments, the light blocking metals 138*a*, 138*b*, 138*c* and 138*d* may have a square shape as shown in FIG. 3, but this is just an example, and the light blocking metals 138*a*, 138*b*, 138*c* and 138*d* may have various shapes as long as the light blocking metals 138*a*, 138*b*, 138*c* and 138*d* are overlapped with the region adjacent to the area outside of the part of the boundary that is not parallel to an alignment direction of liquid crystal molecules among the boundaries of the extended portions 196 and 198.

In some embodiments, the light blocking metals 138*a*, 138*b*, 138*c* and 138*d* may be overlapped with at least a part of the boundary that is not parallel to an alignment direction of liquid crystal molecules among the boundaries of the extended portions 196 and 198. In the embodiment described with reference to FIG. 3, the light blocking metals 138*a*, 138*b*, 138*c* and 138*d* are described as being overlapped with the whole of the boundary which is not parallel to an alignment direction of liquid crystal molecules among the boundaries of the extended portions 196 and 198, but the present disclosure is not limited thereto.

In some embodiments, at least a part of the light blocking metals 138*a*, 138*b*, 138*c* and 138*d* may be overlapped with the light blocking pattern 192 as shown in FIG. 3. Furthermore, at least a part of the light blocking metals 138*a*, 138*b*, 138*c* and 138*d* may be overlapped with the extended portions 196 and 198. However, this is just an example, and although not shown in the drawings, the boundaries of the light blocking metals 138*a*, 138*b*, 138*c* and 138*d* may coincide or roughly coincide with a boundary of the light blocking pattern 192, thus making the light blocking metals 138*a*, 138*b*, 138*c* and 138*d* not overlap with the light blocking pattern 192.

In some embodiments, at least a part of the light blocking metals 138*a*, 138*b*, 138*c* and 138*d* may be overlapped with the pixel electrode 182 and the color filter 152 as shown in FIG. 2, but the present disclosure is not limited thereto.

In some embodiments, the light blocking metals 138*a*, 138*b*, 138*c* and 138*d* may be disposed in the same level/layer as the data wirings 132, 134 and 136. That is, the light blocking metals 138*a*, 138*b*, 138*c* and 138*d* may be formed simultaneously with the data wirings 132, 134 and 136.

In some embodiments, the light blocking metals 138*a*, 138*b*, 138*c* and 138*d* may be formed integrally with the data line 132 and the source electrode 134, or formed integrally with the drain electrode 136. For example, the light blocking metals 138*a*, 138*b*, 138*c* and 138*d* may be protruded/branched from the drain electrode 136 as shown in FIG. 2 and FIG. 3. That is, the light blocking metals 138*a*, 138*b*, 138*c* and 138*d* may be formed integrally with the drain electrode 136. More specifically, the first light blocking metal 138*a* may protrude in one direction from the drain electrode 136 of a first pixel, and the third light blocking metal 138*c* may protrude in the other direction opposite to the one direction from the drain electrode 136 of the first pixel. The second light blocking metal 138*b* may protrude in one direction from the drain electrode 136 of a second pixel, and the fourth light blocking metal 138*d* may protrude in the other direction opposite to the one direction from the drain electrode 136 of the second pixel. As a resolution of an LCD becomes higher, a width of a pixel may decrease, and thus the light blocking metals 138*a*, 138*b*, 138*c* and 138*d* may be distributed in a plurality of pixels. As shown in FIG. 2 and FIG. 3, the first and third light blocking metals 138*a* and 138*c* may be disposed in a first pixel region, and the second and fourth light blocking metals 138*b* and 138*d* may be disposed in a second pixel region. More specifically, a part of the third light blocking metal 138*c* may be disposed in the first pixel region, and the other part of the third light blocking metal 138*c* may be disposed in a pixel region adjacent to and below the first pixel region. A part of the fourth light blocking metal 138*d* may be disposed in the second pixel region, and the other part of the fourth light blocking metal 138*d* may be disposed in a pixel region adjacent to and below the second pixel region.

Embodiments described with reference to FIG. 1 to FIG. 3 show the light blocking metals 138*a*, 138*b*, 138*c* and 138*d* formed integrally with the drain electrode 136, but the present disclosure is not limited thereto, and the light blocking metals 138*a*, 138*b*, 138*c* and 138*d* may be separated from the data wirings 132, 134 and 136.

FIG. 4 is an enlarged diagram of a region A-1 of a liquid crystal display device corresponding to region A of FIG. 1 according to another embodiment of the present inventive concept.

Referring to FIG. 4, a liquid crystal display device 10-1 according to another embodiment of the present inventive concept differs from the liquid crystal display device 10 described with reference to FIG. 1 to FIG. 3 with respect to structures of light blocking metals 138*a*-1, 138*b*-1, 138*c*-1 and 138*d*-1, and other components may be the same or similar. Hereinafter, duplicate description of the same content as those of the foregoing embodiment will be omitted and description will be made mainly on differences.

The light blocking metals 138*a*-1, 138*b*-1, 138*c*-1 and 138*d*-1 of the liquid crystal display device 10-1 according to another embodiment of the present inventive concept may include a first light blocking metal 138*a*-1 overlapped with the region adjacent to and outside of the left boundary among the boundaries of the first extended portion 196, a second light blocking metal 138*b*-1 overlapped with the region adjacent to and outside of the right boundary among the boundaries of the first extended portion 196, a third light blocking metal 138*c*-1 overlapped with the region adjacent to and outside of the left boundary among the boundaries of the second extended portion 198, and a fourth light blocking metal 138*d*-1 overlapped with the region adjacent to and outside of the right boundary among the boundaries of the second extended portion 198.

The light blocking metals 138*a*-1, 138*b*-1, 138*c*-1 and 138*d*-1 may be disposed at the same level with the data wirings 132, 134 and 136. That is, the light blocking metals 138*a*-1, 138*b*-1, 138*c*-1 and 138*d*-1 may be formed simultaneously with the data wirings 132, 134 and 136.

In the present embodiment, the light blocking metals 138*a*-1, 138*b*-1, 138*c*-1 and 138*d*-1 may be separated from the data wirings 132, 134 and 136. More specifically, the first light blocking metal 138*a*-1 may be spaced apart from the drain electrode 136 of the first pixel in one direction, and the third light blocking metal 138*c*-1 may be spaced apart from the drain electrode 136 of the first pixel in the other direction opposite to the one direction. Furthermore, the second light blocking metal 138*b*-1 may be spaced apart from the drain electrode 136 of the second pixel in one direction, and the fourth light blocking metal 138*d*-1 may be spaced apart from the drain electrode 136 of the second pixel in the other direction opposite to the one direction.

In some embodiments, the light blocking metals 138*a*-1, 138*b*-1, 138*c*-1 and 138*d*-1 may be formed simultaneously with and at the same level as the data wirings 132, 134 and 136, but the present disclosure is not limited thereto, and the light blocking metals 138*a*-1, 138*b*-1, 138*c*-1 and 138*d*-1 may be formed simultaneously with and at the same level as the gate wirings 102 and 104.

FIG. 5 is an enlarged diagram of a region A-2 of a liquid crystal display device corresponding to region A of FIG. 1 according to still another embodiment of the present inventive concept.

Referring to FIG. 5, a liquid crystal display device 10-2 according to still another embodiment of the present inventive concept differs from the liquid crystal display device 10 described with reference to FIG. 1 to FIG. 3 with respect to structures of light blocking metals 106*a*, 106*b*, 106*c* and 106*d*, and other components may be the same or similar. Hereinafter, duplicate description of the same content as those of the foregoing embodiment will be omitted and description will be made mainly on differences.

The light blocking metals 106*a*, 106*b*, 106*c* and 106*d* of the liquid crystal display device 10-2 according to still another embodiment of the present inventive concept may include a first light blocking metal 106*a* overlapped with the region adjacent to the outside of the left boundary among the boundaries of the first extended portion 196, a second light blocking metal 106*b* overlapped with the region adjacent to the outside of the right boundary among the boundaries of the first extended portion 196, a third light blocking metal 106*c* overlapped with the region adjacent to the outside of the left boundary among the boundaries of the second extended portion 198, and a fourth light blocking metal 106*d* overlapped with the region adjacent to the outside of the right boundary among the boundaries of the second extended portion 198.

The light blocking metals 106*a*, 106*b*, 106*c* and 106*d* may be disposed at the same level as the gate wirings 102 and 104. That is, the light blocking metals 106a, 106b, 106c and 106d may be formed simultaneously with the gate wirings 102 and 104.

The light blocking metals 106a, 106b, 106c and 106d may be protruded/branched from the gate line 102 as shown in FIG. 5. That is, the light blocking metals 106a, 106b, 106c and 106d may be formed integrally with the gate line 102. More specifically, the first and second light blocking metals 106a and 106b may be protruded in one direction from the gate line 102, and the third and fourth light blocking metals 106c and 106d may be protruded in the other direction opposite to the one direction from the gate line 102. A length of the protrusion of the first and second light blocking metals 106a and 106b from the gate line 102 may be longer than a length of the protrusion of the third and fourth light blocking metals 106c and 106d from the gate line 102.

Embodiment described with reference to FIG. 5 exemplifies the light blocking metals 106a, 106b, 106c and 106d formed integrally with the gate line 102, but the present disclosure is not limited thereto, and the light blocking metals 106a, 106b, 106c and 106d may be separated from the gate wirings 102 and 104.

FIG. 6 is an enlarged diagram of a region A-3 of a liquid crystal display device corresponding to region A of FIG. 1 according to still another embodiment of the present inventive concept.

Referring to FIG. 6, a liquid crystal display device 10-3 according to still another embodiment of the present inventive concept differs from the liquid crystal display device 10-2 described with reference to FIG. 5 with respect to structures of light blocking metals 106a-1, 106b-1, 106c-1 and 106d-1, and other components may be the same or similar. Hereinafter, duplicate description of the same content as those of the foregoing embodiment will be omitted and description will focus on differences.

The light blocking metals 106a-1, 106b-1, 106c-1 and 106d-1 of the liquid crystal display device 10-3 according to still another embodiment of the present inventive concept may include a first light blocking metal 106a-1 overlapped with the region outside of and adjacent to the left boundary among the boundaries of the first extended portion 196, a second light blocking metal 106b-1 overlapped with the region adjacent to and outside of the right boundary among the boundaries of the first extended portion 196, a third light blocking metal 106c-1 overlapped with the region adjacent to and outside of the left boundary among the boundaries of the second extended portion 198, and a fourth light blocking metal 106d-1 overlapped with the region adjacent to and outside of the right boundary among the boundaries of the second extended portion 198.

The light blocking metals 106a-1, 106b-1, 106c-1 and 106d-1 may be spaced apart from the gate line 102 as shown in FIG. 6. That is, the light blocking metals 106a-1, 106b-1, 106c-1 and 106d-1 may be separated from the gate line 102. More specifically, the first and second light blocking metals 106a-1 and 106b-1 may be spaced apart in one direction from the gate line 102, and the third and fourth light blocking metals 106c-1 and 106d-1 may be spaced apart in the other direction opposite to the one direction from the gate line 102. A distance between the first and second light blocking metals 106a-1 and 106b-1 and the gate line 102 may be longer than a distance between the third and fourth light blocking metals 106c-1 and 106d-1 and the gate line 102.

In some embodiments, light blocking metals may be formed simultaneously with and at the same level/layer as either the data lines 132, 134, 136 or the gate wirings 102 and 104. However, this is just an example and a part of the light blocking metals may be formed with and at the same level/layer as the data wirings 132, 134 and 136 while other parts of the light blocking metals may be formed with and at the same level/layer as the gate wirings 102 and 104.

FIG. 7 is an enlarged diagram of a region A-4 of a liquid crystal display device corresponding to region A of FIG. 1 according to still another embodiment of the present inventive concept.

Referring to FIG. 7, a liquid crystal display device 10-4 according to still another embodiment of the present inventive concept differs from the liquid crystal display device 10 described with reference to FIG. 1 to FIG. 3 with respect to structures of light blocking metals 138a-2, 138b-2, 106c-2 and 106d-2, and other components may be the same or similar. Hereinafter, duplicate description of the same content as those of the foregoing embodiment will be omitted and description will be made mainly on differences.

The light blocking metals 138a-2, 138b-2, 106c-2 and 106d-2 of the liquid crystal display device 10-4 according to still another embodiment of the present inventive concept may include a first light blocking metal 138a-2 overlapped with the region adjacent to and outside of the left boundary among the boundaries of the first extended portion 196, a second light blocking metal 138b-2 overlapped with the region adjacent to and outside of the right boundary among the boundaries of the first extended portion 196, a third light blocking metal 106c-2 overlapped with the region adjacent to and outside of the left boundary among the boundaries of the second extended portion 198, and a fourth light blocking metal 106d-2 overlapped with the region adjacent to and outside of the right boundary among the boundaries of the second extended portion 198.

The light blocking metals 138a-2, 138b-2, 106c-2 and 106d-2 may protrude from the drain electrode 136 or the gate line 102 as shown in FIG. 7. That is, the light blocking metals 138a-2, 138b-2, 106c-2 and 106d-2 may be formed integrally with the drain electrode 136 or the gate line 102. More specifically, the first light blocking metal 138a-2 may protrude in one direction from the drain electrode 136 of the first pixel, and the second light blocking metal 138b-2 may protrude in one direction from the drain electrode 136 of the second pixel. Furthermore, the third light blocking metal 106c-2 may protrude from the gate line 102 in the direction opposite to the direction in which the first light blocking metal 138a-2 protrudes, and the fourth light blocking metal 106d-2 may protrude from the gate line 102 in the direction opposite to the direction in which the second blocking metal 138b-2 protrudes.

FIG. 8 is an enlarged diagram of a region A-5 of a liquid crystal display device corresponding to region A of FIG. 1 according to still another embodiment of the present inventive concept.

Referring to FIG. 8, a liquid crystal display device 10-5 according to still another embodiment of the present inventive concept differs from the liquid crystal display device 10 described with reference to FIG. 1 to FIG. 3 with respect to structures of light blocking metals 138a-3, 138b-3, 106c-3 and 106d-3, and other components may be the same or similar. Hereinafter, duplicate description of the same content as those of the foregoing embodiment will be omitted and description will be made mainly on differences.

The light blocking metals 138a-3, 138b-3, 106c-3 and 106d-3 of the liquid crystal display device 10-5 according to still another embodiment of the present inventive concept may include a first light blocking metal 138a-3 overlapped with the region adjacent to the outside of the left boundary among the boundaries of the first extended portion 196, a second light blocking metal 138b-3 overlapped with the region adjacent to the outside of the right boundary among the boundaries of the first extended portion 196, a third light blocking metal 106c-3 overlapped with the region adjacent to and outside of the left boundary among the boundaries of the second extended portion 198, and a fourth light blocking metal 106d-3 overlapped with the region adjacent to and outside of the right boundary among the boundaries of the second extended portion 198.

The light blocking metals 138a-3, 138b-3, 106c-3 and 106d-3 may be spaced apart from the drain electrode 136 or gate line 102 as shown in FIG. 8. That is, the light blocking metals 138a-3, 138b-3, 106c-3 and 106d-3 may be separated from the drain electrode 136 or the gate line 102. More specifically, the first light blocking metal 138a-3 may be spaced apart in one direction from the drain electrode 136 of the first pixel, and the second light blocking metal 138b-3 may be spaced apart in one direction from the drain electrode 136 of the second pixel. In addition, the third and fourth light blocking metals 106c-3 and 106d-3 may be spaced apart from the gate line 102 in the other direction opposite to the one direction.

In some embodiments, light blocking metals may protrude or be spaced apart from the data wirings 132, 134 and 136 and gate wirings 102 and 104, but this is just an example, and a part of the light blocking metals may protrude from the data wirings 132, 134 and 136 or the gate line 102 and 104, and the other part of the light blocking metals may be spaced apart from the data wirings 132, 134 and 136 or the gate line 102.

In some embodiments, light blocking metals are exemplified as being formed at the same level as the data wirings 132, 134 and 136 or the gate wirings 102 and 104, but this is just an example, and the light blocking metals may be disposed at other levels as long as the light blocking metals are overlapped with the region adjacent to and outside of the boundary that is not parallel to an alignment direction of liquid crystal molecules among the boundaries of the extended portions 196 and 198.

Next, a method of manufacturing the aforementioned liquid crystal display device 10 according to an embodiment of the present inventive concept will be described.

FIG. 9 to FIG. 21 are diagrams illustrating intermediate process steps of a method of manufacturing the liquid crystal display device according to an embodiment of the present inventive concept.

Referring to FIG. 1, FIG. 2 and FIG. 9, the gate wirings 102 and 104 are formed on the first substrate 100.

A first metal layer (not shown) may be formed on the first substrate 100 including a transparent material, for example, glass and quartz. The first metal layer (not shown) may be made of aluminum, copper, silver, molybdenum, chrome, titanium, tantalum or an alloy thereof, and may be formed into two or more layers having different physical properties. The first metal layer (not shown) may be deposited by, for example, a sputtering process. Subsequently, the first metal layer (not shown) may be patterned through a photoetching process using an exposure mask so as to form the gate wirings 102 and 104 including the gate line 102 and the gate electrode 104. The gate electrode 104 may have a protuberance shape branched from the gate line 102.

In some embodiments, light blocking metals may be formed through the same process as that of the gate wirings 102 and 104. For example, when manufacturing the above-described liquid crystal display devices 10-2, 10-3, 10-4 and 10-5, the process of patterning the first metal layer may be performed considering the shape of the light blocking metals to be formed (106a, 106b, 106c and 106d of FIG. 5 for the device 10-2, 106a-1, 106b-1, 106c-1 and 106d-1 of FIG. 6 for the device 10-3, 106c-2 and 106d-2 of FIG. 7 for the device 10-4, and 106c-3, 106d-3 of FIG. 8 for the device 10-5). The light blocking metals may be overlapped with at least a part of the region adjacent to and outside of the boundary that is not parallel to an alignment direction of liquid crystal molecules among the boundaries of the extended portions, which will be formed later.

Referring now to FIG. 10, the gate insulation layer 112 may be formed on the gate wirings 102 and 104. The gate insulation layer 112 may be formed through a plasma enhanced chemical vapor deposition (PECVD) process, and may include silicon nitride (SiNx), silicon oxide (SiO2) or the like.

Referring to FIG. 11, the semiconductor layer 122 and the ohmic contact layer 124 may be formed on the gate insulation layer 112. The semiconductor layer 122 may be made of hydrogenated amorphous silicon or polycrystalline silicon. The semiconductor layer 122 and the ohmic contact layer 124 may be formed through a photoetching process.

Referring to FIG. 1 to FIG. 3 and FIG. 12, the data wirings 132, 134 and 136 including the data lines 132 intersecting the gate lines 102 so as to define unit pixels, the source electrodes 134 and the drain electrodes 136 may be formed on the gate insulation layer 112, the semiconductor layer 122 and the ohmic contact layer 124 through a photoetching process. Like the gate wirings 102 and 104, the data wirings 132, 134 and 136 may be made of aluminum, copper, silver, molybdenum, chrome, titanium, tantalum or an alloy thereof, and may be formed into two or more layers having different physical properties.

The light blocking metals 138a, 138b, 138c and 138d may be formed at the same level as the data wirings 132, 134 and 136 through the same process as that of the data wirings 132, 134 and 136. Specifically, a second metal layer (not shown) may be formed on the gate insulation layer 112. The second metal layer (not shown) may be deposited by, for example, a sputtering process. Subsequently, the second metal layer (not shown) may be patterned through a photoetching process using an exposure mask so as to form the data wirings 132, 134 and 136 and the light blocking metals 138a, 138b, 138c and 138d. The process of patterning the second metal layer may be performed in consideration of the shape of the light blocking metals 138a, 138b, 138c and 138d to be formed. When manufacturing the above-described liquid crystal display devices 10-1, 10-4 and 10-5, the process of patterning the first metal layer may be performed in consideration of the shape of the light blocking metals to be formed (138a-1, 138b-1, 138c-1 and 138d-1 of FIG. 4 for the device 10-1, 138a-2 and 138b-2 of FIG. 7 for the device 10-4, 138a-3 and 138b-3 of FIG. 8 for the device 10-5). The light blocking metals may be overlapped with at least a part of the region adjacent to and outside of the part of the boundary which is not parallel to an alignment direction of liquid crystal molecules among the boundaries of the extended portions, which will be formed later.

In the present embodiment, the semiconductor layer 122, the ohmic contact layer 124 and the data wirings 132, 134 and 136 are exemplified as being formed through photoetching processes performed separately from each other, but the present disclosure is not limited thereto, and the semiconductor layer 122, the ohmic contact layer 124 and the data wirings 132, 134 and 136 may be formed through a photoetching processing using a single mask. In this case, residues of the semiconductor layer 122 and the ohmic contact layer 124 may remain below the data lines 132. In other words, the semiconductor layer 122 and the ohmic contact layer 124 may be formed into a line shape. The semiconductor layer 122 may constitute a thin film transistor together with the gate electrodes 104, the source electrodes 134 and the drain electrodes 136, and may have a channel formed therein.

Referring now to FIG. 13, a first passivation layer 142-1 may be formed on the first substrate 100 on which a thin film transistor is formed. The first passivation layer 142-1 may be made of an inorganic material such as silicon nitride or silicon oxide, or materials such as a-Si:C:O and a-Si:O:F formed through a plasma enhanced chemical vapor deposition (PECVD).

Referring to FIG. 14, the color filter 152 may be formed on the first passivation layer 142-1. The color filter 152 may be disposed in a pixel region and include a red (R) filter, a green (G) filter and a blue (B) filter. The color filter 152 may be made of a photosensitive organic material including pigment.

The color filter 152 may be formed by a photoetching process, an inkjet printing process or various other processes.

Referring to FIG. 15, a first organic layer 154-1 may be formed on the first passivation layer 142-1 and the color filter 152. The first organic layer 154-1 may be made of a material which is excellent in planarizing characteristics and has photosensitivity. The first organic layer 154-1 may be formed by a spin coating process or a slit coating process, or both the spin coating process and the slit coating process.

Referring to FIG. 16, the contact hole 136a for exposing at least a part of the drain electrodes 136 may be formed in the first passivation layer 142-1 and the first organic layer 154-1. Specifically, the contact hole 136a may be formed in the first organic layer 154-1 so as to form the organic layer 154, and then the contact hole 136a may be formed in the first passivation layer 142-1 so as to form the first passivation layer 142.

Referring to FIG. 17, the common electrode 162 may be formed on the organic layer 154 and the first passivation layer 142-1. The common electrode 162 may include an aperture for exposing a region in which the contact hole 136a is formed. The common electrode 162 may be formed into a single body throughout the pixel region enclosed by the gate lines 102 and the data lines 132, excluding the aperture. The common electrode 162 may be made of a transparent conductive material such as polycrystalline, single crystalline or amorphous indium tin oxide (ITO) or indium zinc oxide (IZO), but the present disclosure is not limited thereto.

Referring to FIG. 18, the second passivation layer 172 may be formed on the common electrode 162 and the organic layer 154. The second passivation layer 172 may include an aperture for exposing an area where the contact hole 136a is formed. The second passivation layer 172 may be formed through processes including a process of depositing an inorganic insulation material, for example, silicon nitride, silicon oxide or the like on the common electrode 162 and the organic layer 154 and a process of patterning the resultant structure so as to expose the region in which the contact hole 136a is formed.

Referring to FIG. 19, the pixel electrode 182 may be formed on the second passivation layer 172 and the organic layer 154. Specifically, the pixel electrode 182 may be formed to contact at least a part of the drain electrode 136 exposed by the aperture formed in the second passivation layer 172 and the contact hole 136a formed in the organic layer 154 and the first passivation layer 142. Through such contact, the pixel electrode 182 may be electrically connected to the drain electrode 136.

Referring FIG. 1 to FIG. 3 and FIG. 20, the light blocking pattern 192 may be formed on the pixel electrode 182 and the second passivation layer 172.

The light blocking pattern 192 may be formed in a region in which the liquid crystal molecules contained in the liquid crystal layer 300 do not operate, for example, a thin film transistor region and a non-pixel region (between pixels, and regions of gate lines and data lines).

In some embodiments, the light blocking pattern 192 may extend in the direction of extending the gate lines 102 as shown in FIG. 1. However, this is just an example, and the light blocking pattern 192 may further be disposed in a region of data lines 132 so as to form a lattice shape in other embodiments.

The light blocking pattern 192 may be made of a black organic polymer material including black dye or pigment, or metal (metal oxide) such as chrome or chrome oxide.

Then, the column spacer 194 may be formed on the light blocking pattern 192. The column spacer 194 may be formed integrally and simultaneously with the light blocking pattern 192 as shown in FIG. 20. For example, the column spacer 194 and the light blocking pattern 192 may be simultaneously formed of the same material through the same patterning process using a halftone mask or slit mask exposure. However, this is just an example, and the present disclosure is not limited thereto.

The column spacer 194 may be formed in a region corresponding to a thin film transistor as shown in FIG. 20. However, this is an example, and the position of the column spacer 194 is not limited thereto.

Referring now to FIG. 21, the alignment layer PI may be formed on each of the first substrate 100 and the second substrate 200. Subsequently, liquid crystal molecules having positive or negative dielectric anisotropy may be applied to the first substrate 100 so as to form the liquid crystal layer 300. Then, the first substrate 100 having the liquid crystal layer 300 formed thereon may be coupled to the second substrate 200.

When the light blocking pattern 192 and the column spacer 194 are simultaneously formed, and when the panel warps by force applied from an external source, the alignment layer PI disposed on the second substrate 200 may be scratched by the column spacer 194, causing light leakage to occur.

Thus, a method of manufacturing the liquid crystal display device 10 according to an embodiment of the present inventive concept includes enabling the light blocking pattern 192 to have the extended portions 196 and 198 for preventing light leakage caused by the scratch described above. The extended portions 196 and 198 may be formed simultaneously and integrally with the light blocking pattern 192 through a single patterning process. The extended portions 196 and 198 may be made of a material same as that of the light blocking pattern 192. That is, the light blocking pattern 192, the extended portions 196 and 198 and the column spacer 194 may be integrally formed of the same material through a single patterning process.

The arrangement and size of the extended portions 196 and 198 may be appropriately selected according to a positional relation between the light blocking pattern 192 and the column spacer 194. For example, when the column spacer 194 is disposed at the center of the width W2 of the light blocking pattern 192 as shown in FIG. 1 and FIG. 3, the extended portions 196 and 198 may be protruded/branched respectively from the light blocking pattern 192 in one direction and the other direction opposite to the one direction.

Meanwhile, since the extended portions 196 and 198 may be protruded/branched from the light blocking pattern 192, the extended portions 196 and 198 may have a boundary that is not parallel to an alignment direction of liquid crystal molecules. The liquid crystal molecules may not be smoothly controlled in a region adjacent to and outside of the part of the boundary that is not parallel to an alignment direction of liquid crystal molecules, causing light leakage to occur.

Thus, the method of manufacturing the liquid crystal display device 10 according to an embodiment of the present inventive concept may include forming light blocking metals 138a, 138b, 138c and 138d for preventing light leakage caused by the extended portions 196 and 198. That is, the light blocking metals 138a, 138b, 138c and 138d may be overlapped with the region adjacent to and outside of the part of the boundary that is not parallel to an alignment direction of liquid crystal molecules among the boundaries of the extended portions 196 and 198. Thus, light leakage caused when the liquid crystal molecules are not controlled in the region adjacent to the part of the boundary that is not parallel to an alignment direction of the liquid crystal molecules among the boundaries of the extended portions 196 and 198 is reduced.

The foregoing is illustrative of exemplary embodiments and is not to be construed as limiting thereof. Although a few exemplary embodiments have been described, those skilled in the art will readily appreciate that many modifications and applications are possible in exemplary embodiments without materially departing from the novel teachings and advantages of the embodiments of the present inventive concept. For example, each component described specifically in the embodiments of the present inventive concept may be modified. Furthermore, it is to be understood that the differences related to the modifications and applications may be understood as being intended to be included within the scope of the appended claims.

What is claimed is:

1. A liquid crystal display device comprising:
   a first substrate and a second substrate facing each other;
   a liquid crystal layer interposed between the first substrate and the second substrate;
   a common electrode disposed between the liquid crystal layer and the first substrate;
   a pixel electrode disposed between the common electrode and the liquid crystal layer;
   a column spacer disposed on the first substrate and maintaining a gap between the first substrate and the second substrate;
   a light blocking pattern layer disposed on the first substrate and including an extended portion formed around the column spacer; and
   at least one of a plurality of light blocking metals overlapped with at least a part of a region adjacent to an outside of a boundary of the extended portion, the boundary of the extended portion being not parallel to an alignment direction of liquid crystal molecules,
   wherein the light blocking pattern layer includes a base pattern extending in a first direction, a first extended portion protruding in a second direction from the base pattern and a second extended portion protruding in a third direction from the base pattern,
   wherein the first direction and the second direction intersect each other,
   wherein the second direction is opposite to the third direction, and
   wherein the plurality of light blocking metals include a first light blocking metal overlapped with the region adjacent to the outside of a left boundary of the first extended portion, a second light blocking metal overlapped with the region adjacent to the outside of a right boundary of the first extended portion, a third light blocking metal overlapped with the region adjacent to the outside of a left boundary of the second extended portion, and a fourth light blocking metal overlapped with the region adjacent to the outside of a right boundary of the second extended portion.

2. The liquid crystal display device of claim 1, wherein the at least one of the plurality of the light blocking metals is overlapped with at least a part of the boundary that is not parallel to an alignment direction of liquid crystal molecules.

3. The liquid crystal display device of claim 1, further comprising a gate wiring and a data wiring disposed on the first substrate,
   wherein at least one of the plurality of the light blocking metals is disposed at a same level as at least one of the gate wiring and the data wiring.

4. The liquid crystal display device of claim 3, wherein the data wiring includes a drain electrode, and at least one of the plurality of the light blocking metals is disposed at a same level as the data wiring and formed integrally with the drain electrode.

5. The liquid crystal display device of claim 3, wherein at least one of the plurality of the light blocking metals is disposed at a same level as the data wiring and separated from the data wiring.

6. The liquid crystal display device of claim 3, wherein at least a part of the light blocking metal is disposed at a same level as the gate wiring and formed integrally with the gate wiring.

7. The liquid crystal display device of claim 3, wherein at least a part of the light blocking metal is disposed at a same level as the gate wiring and separated from the gate wiring.

8. The liquid crystal display device of claim 1, wherein the extended portion has a square shape.

9. The liquid crystal display device of claim 1, wherein the extended portion includes a first extended portion disposed at one side of the column spacer and a second extended portion disposed across the column spacer from the first extended portion.

10. The liquid crystal display device of claim 1, further comprising a gate line and a data line disposed on the first substrate and intersecting each other so as to define a unit pixel,
   wherein the light blocking pattern layer extends in a same direction as the gate line, and the extended portion protrudes in a direction non-parallel to the direction of the gate line.

11. The liquid crystal display device of claim 10, wherein the alignment direction of liquid crystal molecules is the same as the direction of in which the gate line extends.

12. The liquid crystal display device of claim 1, wherein the light blocking pattern layer and the column spacer are formed integrally, and
   wherein the light blocking pattern layer includes organic polymer material.

* * * * *